Dec. 19, 1939.  E. C. RANEY  2,183,973
CONTROL APPARATUS
Filed Dec. 18, 1936  3 Sheets-Sheet 2

INVENTOR
Estel C. Raney
BY
Warren H. F. Schmidt
ATTORNEY

Dec. 19, 1939.  E. C. RANEY  2,183,973
CONTROL APPARATUS
Filed Dec. 18, 1936  3 Sheets-Sheet 3

INVENTOR
Estel C. Raney
BY
Warren H. F. Schmieding
ATTORNEY

Patented Dec. 19, 1939

2,183,973

UNITED STATES PATENT OFFICE 2,183,973

CONTROL APPARATUS

Estel C. Raney, Columbus, Ohio, assignor to Ranco, Incorporated, Columbus, Ohio, a corporation of Ohio Application December 18, 1936, Serial No. 116,633

5 Claims. (Cl. 158—28)

My present invention relates to electrical control circuits and more particularly to thermally controlled circuits for use with fluid fuel systems and also to the thermal controls for use in said circuits.

One of the objects of my invention is to provide an automatic temperature control system for a fuel feeding apparatus, for example, oil-burning equipment, which system utilizes a transformer relay that is responsive to a thermostat for controlling the motor-blower oil feed to the burner; a stack control is also provided for the system to check the ignition of the burner after the thermostat has closed the control circuit.

Another object is to provide a control system including an automatically operated thermal responsive circuit breaker having electrically operated heating means associated therewith and a control for the heating means, which latter control varies the effect of the heating means in response to the conditions of the system.

A further object is to provide an automatic system particularly applicable to a fluid fuel apparatus, which includes a thermal responsive circuit breaker that is associated with a plurality of heating coils, one of the heating coils being capable of actuating the circuit breaker within a predetermined time period while the other coil is incapable of actuating the breaker, the latter merely being used for preheating the thermal element of the breaker so that it will be in condition for substantially instant operation; the energization of the heating coils is controlled by a switch that is responsive to combustion conditions of the device and being controlled so that the high temperature heating coil is energized only when combustion is not established, while the low heat coil is energized when combustion is established.

It is a further object of my invention to provide a device for igniting the fuel supply and to also provide a timing control for said igniting device so that the device is only operative for a predetermined period during the starting function of the system. In carrying out the above object, it is a still further object to provide a plurality of circuits including an interlocking circuit or holding circuit which, in the event of current failure, is interrupted to cause the motor blower to remain de-energized until the timing control has again completed the ignition circuit.

Other and further objects and advantages will be apparent from the following description, reference being had to the accompanying drawings wherein preferred forms of embodiments of the present invention are clearly shown.

Figure 1:
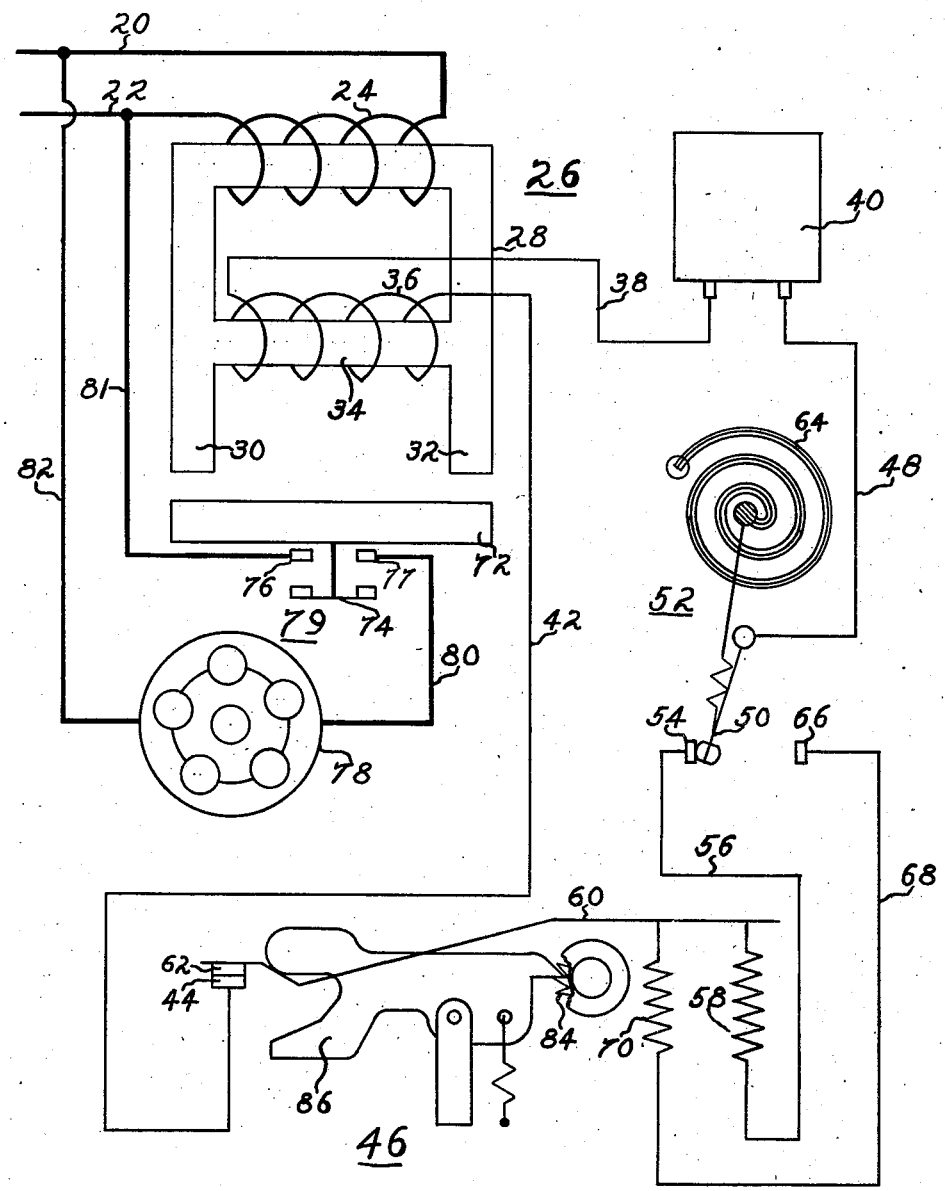
Fig. 1 is a diagrammatic view showing a fuel control system employing one type of thermal circuit breaker in circuit with a transformer relay, room thermostat and stack control switch.

One embodiment of the fuel control circuit is shown in Fig. 1, where electrical energy is supplied by power lines 20 and 22. The wires 20 and 22 connect directly to a primary winding 24 of a transformer relay 26 to constantly energize the same. The relay 26 has an iron core 28, preferably an A-shape, with two downwardly extended legs 30 and 32. A cross-bar 34 extends between the two leg portions 30 and 32 about midway up the legs. A secondary winding 36 is wound around the connecting bar 34. The secondary 36 is connected by a wire 38 to a room thermostat 40 and by wire 42 to a contact 44 of a thermal responsive circuit breaker 46.

The thermostat 40 is connected by a wire 48 to a movable contact element 50 of a stack control or combustion switch 52. The control 52, which in the preferred form includes a snap acting switch, is positioned so that it is responsive to temperature changes within the stack, or combustion chamber of the furnace, or other device, which may include an oil burner. The control 52 is connected to the circuit breaker 46. Thus, at the moment the thermostat 40 closes, current flows from the movable contact 50 of switch 52 through fixed contact 54, wire 56, heating coil 58, member 60 to contact 62, which is contacting the contact 44 to complete the circuit by wire 42 through the secondary winding 36 of the transformer relay 26. The oil burning apparatus is then started, as will be explained hereinafter. When the oil spray ignites, and the device is functioning properly, there is a generation of heat in the combustion chamber which affects the thermal responsive stack switch 52. As the temperature rises within the combustion chamber, the coiled bimetallic element 64 of the stack control 52 distorts and rotates the mechanism, which snaps the movable contact element 50 through its center and breaks contact with contact 54. Practically simultaneously, the element 50 contacts the fixed contact 66, which completes the circuit through wire 68, heating coil 70, member 60, contact 62 to the contact 44 which is in series through wire 42 with the secondary 34 of transformer 26.

A second circuit is provided for the system which is not directly connected to the aforementioned control circuit of the stack switch 52. This circuit includes a motor blower 78 to be controlled and capable of supplying an air and oil mixture to the burner. The motor-blower 78 may be of any familiar design. The motor 78 is connected to the power line 20 by a wire 82. The other motor connection is connected by a wire 80 to a fixed contact 77 of a magnetic switch 79. The switch 79 is provided with a movable bridging member 74 which is connected to a movable armature 72, associated with the transformer relay 26. The bridging member 74, when drawn upwardly by the armature 72, closes the circuit between the contact 77 and a second contact 76 which latter is connected by a wire 81 to the other side of the power line, namely main 22.

The functioning of the transformer 26 as a transformer and as a relay is explained as follows: When the secondary circuit is open, the flux set up by coil 24 travels down one leg, as 30, across the bar 34 up leg 32 to again retrace this path of movement. The primary 24 is drawing an infinitesimal quantity of current from the line when the secondary circuit is deenergized. As soon as the secondary circuit 36 is completed by the closing of the thermostat 40, an induced current is set up in the secondary coil 36 which causes a flux movement independent of the primary flux, in the bar 34. The secondary flux opposes the passage of the primary flux through the bar 34, so that the resultant flux path is to the lower part of the legs 30 and 32 which magnetically attracts the armature or bar 72 to form a retracing path of flux through the bar 72. The breaking of secondary circuit 36 by the opening of thermostat 40 breaks the secondary flux and reinstates the path of the primary flux in the bar 34 which path has lower reluctance than the path thru the armature 72, which allows the bar 72 to drop by gravity to open the switch 79 and break the electrical circuit of the motor 78.

The connnection between the circuit breaker 46 and stack control 52 is one of the features of my invention. The two coils 58 and 70 are included as integral parts of the thermal responsive circuit breaker 46. The heaters 58 and 70 are in heat-transfer relation with a solder pot in the form of a ratchet 84. This ratchet is capable of rotation when its soldered mounting is fused. When the ratchet rotates it trips the member 86 to release the resilient member 60 which latter springs upwardly to separate the contacts 44 and 62, to break the circuit. The specific construction details of a circuit breaker of this type may be noted in my Patent Number 2,133,400 issued Oct. 18, 1938, wherein a complete description of the device may be obtained.

Since the coils 58 and 70 are in proximity to the solder, it is evident that the resistance of the coil 58 may be so calculated that its heat output will fuse the solder within a predetermined period to cause the breaker 46 to open the circuit, this principle is utilized as a safety measure. If the fuel oil spray does not ignite, for any cause whatsoever, the movable element 50 of the stack control 52 will remain in contact with contact 54 as there will be no heat to actuate the switch 52. Therefore, a circuit is maintained through the high resistance heater 58. If this heater 58 remains in the circuit a predetermined time period, it will fuse the solder to cause operation of the circuit breaker to separate contact 62 from 44 to break the secondary circuit. Thus, if the system is not operative the circuit breaker will break the secondary circuit which reinstates the flux path through leg 34 of the transformer 26 and causes the armature 72 to drop, to open the switch 79 and break the motor circuit, de-energize the motor-blower 78 and stop the oil feed.

Ordinarily the fuel oil ignites and then the stack switch 52 operates to break the circuit through the heater 58 and connect the heater 70 in circuit. Heater 70 is of such resistance so as to keep the solder at a temperature below its melting, or fusing point, so that if a subsequent fuel failure should occur, heater 58 is again placed in the circuit and the additional heat radiated will quickly operate the breaker 46 with a minimum of time lag. Thus it is apparent that the circuit breaker is maintained in a condition for quick operation at all times when there is a demand for heat.

Figure 2:
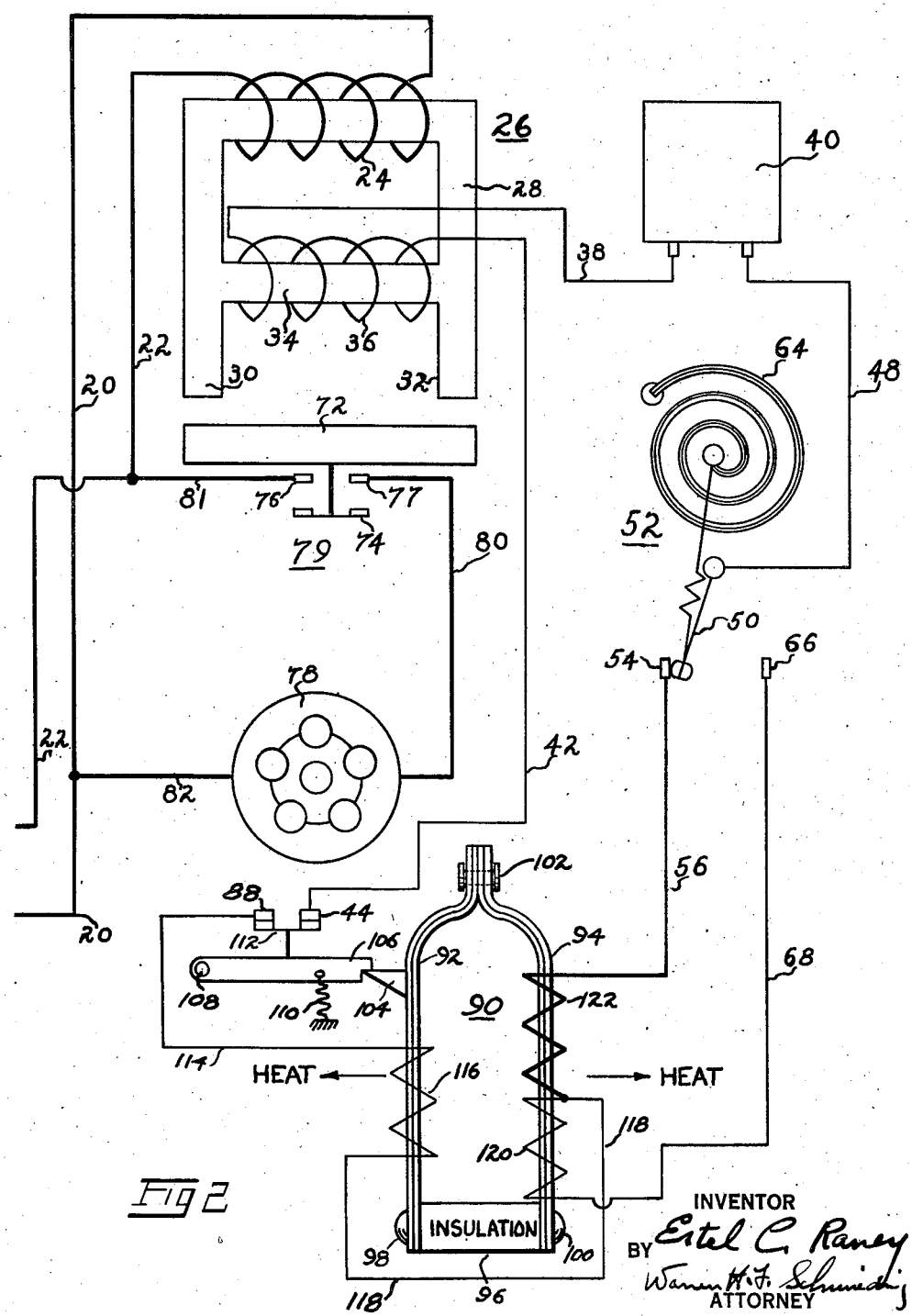
Fig. 2 is a circuit similar to the one shown in Fig. 1 with a current and ambient temperature compensated device substituted for the circuit breaker, and, Fig. 3 is a circuit similar to the one shown in Fig. 1, with the addition of an ignition circuit and control device therefor.

Fig. 2 shows the same control circuit as previously described, but employing a modified type of circuit breaker generally indicated at 90. The circuit breaker consists of a thermostatic couple, 90, in the form of thermostatic detent having two thermostatic elements 92 and 94. Preferably the elements 92 and 94 are bimetallic strips that deform, when heated, in the direction of the arrows on the drawings, although any other thermostatic medium could be employed. In other words, the elements 92 and 94 are so disposed as to bend away from one another when heated. The two elements 92 and 94 are mounted at their lower ends to opposite sides of a block 96, of insulating material, by screws 98 and 100, respectively. The mounting on the block 96 provides a spacing between the elements. The strips 92 and 94 are bent toward one another at their upper ends so that they normally touch each other when at a set temperature. A link 102 is used to engage the two members 92 and 94 at their upper ends to present the separation of the members 92 and 94 when they are heated to different temperatures. The thermostatic element 92 has a latch 104 at its upper end that is disposed to engage a lever 106. The lever 106 is pivoted on a bearing 108 and is under the tension of a connected spring 110, when the lever 106 is engaged by the latch 104. The lever 106 also carries a bridging member 112 to bridge the contacts 44 and 88 when the lever 106 is in the engaged position with the latch 92. The contact 44 is connected by wire 42 to the secondary 36 of the transformer relay 26. The contact 88 is connected by a wire 114 to a heating resistance 116 wound around the thermostat 92 or otherwise disposed in heating relation with the thermostat 92. The resistance 116 is connected by a wire 118 to heating coils 120 and 122, respectively. The coils 120 and 122 are wound around, or otherwise suitably disposed adjacent the element 94. Heating coil or resistance 122 is connected by a wire 56 to the contact 54 of the stack switch 52, while coil 120 is connected by wire 68 to the contact 66 of the stack switch 52.

In the operation of the circuit, when the thermostat 40 closes the secondary or control circuit, the stack switch is in the position shown by the drawings, namely, movable contact 50 of the stack switch is in engagement with fixed contact 54. This position completes a circuit through wire 56, resistance coil 122, wire 118, resistance coil 116, wire 114, contact 88, bridging member 112, contact 44, wire 42, to the secondary 36 of transformer 26 to complete the circuit. This circuit, therefore, energizes the heaters 116 and 122. The heater 122 is a high resistant unit and capable of radiating more heat than the heater 116. This unequal heat balance between the heaters 116 and 122 causes the thermostatic element 94 to exert a greater force in one direction than the element 92 exerts in the opposite direction. The resultant of these unequal and opposing forces is the deflection of the thermostatic couple 90 in the direction of element 94. This movement if allowed to continue, will disengage the latch 104 from the lever 106. However during normal operation the fuel supply ignites to supply heat to the stack control, the switch 52 will break the circuit through coil 122 and make the circuit through coil 120, in the manner previously described, before the latch 104 has become disengaged from lever 106. If, however, the fuel does not ignite, the coil 122 will continue to be energized and, after a predetermined time, will cause the deflection of the thermostatic couple 90 sufficiently to cause the latch 104 to disengage entirely from its engagement with lever 106, at which instant spring 110 pulls lever 106 downwardly to separate the bridging member 112 from the contacts 44 and 88 to break the circuit.

In normal operation, the fuel supply is ignited and the stack switch 52 snaps to connect the movable element 50 to contact 66. Then a circuit is completed through wire 68, heating coil 120, wire 118, heating coil 116, wire 114, contact 88, etc. The coil 116 is preferably of a lower resistance than the coil 120 but sufficiently resistant to cause the thermostatic couple 90 to maintain the latch 104 in engagement with lever 106. Thus, the device is kept in such position that it will trip the lever 106, quickly after failure of combustion, and the stack switch 52 will again make contact with contact 54 to energize the high resistance coil 122. In this manner, an appreciable time lag is eliminated and operation is obtained within a short time period after the stack switch 52 operates.

A feature of the thermostatic compensator 90 is its resistance toward changes in environment temperatures. Both thermostatic elements are subjected to the same environment temperature and therefore the opposing force changes are always proportioned to maintain the couple 90 in substantially the same position, regardless of ambient temperature changes.

It is evident that in either of the modifications of the thermal responsive tripping device, that the double heater element may be replaced by a single element which has a connection, or tap at some point intermediate the ends thereof. This tap may be connected to one contact of the stack switch 52. Thus in effect, operation of the switch 52 would shunt out part of the resistance to change the heat output of the heater. This modification is entirely within the scope of my invention and the results obtained are analogous to the described results.

After any of the described types of circuit breakers have tripped, or operated, manual resetting is necessary to again make the system operative.

Figure 3:
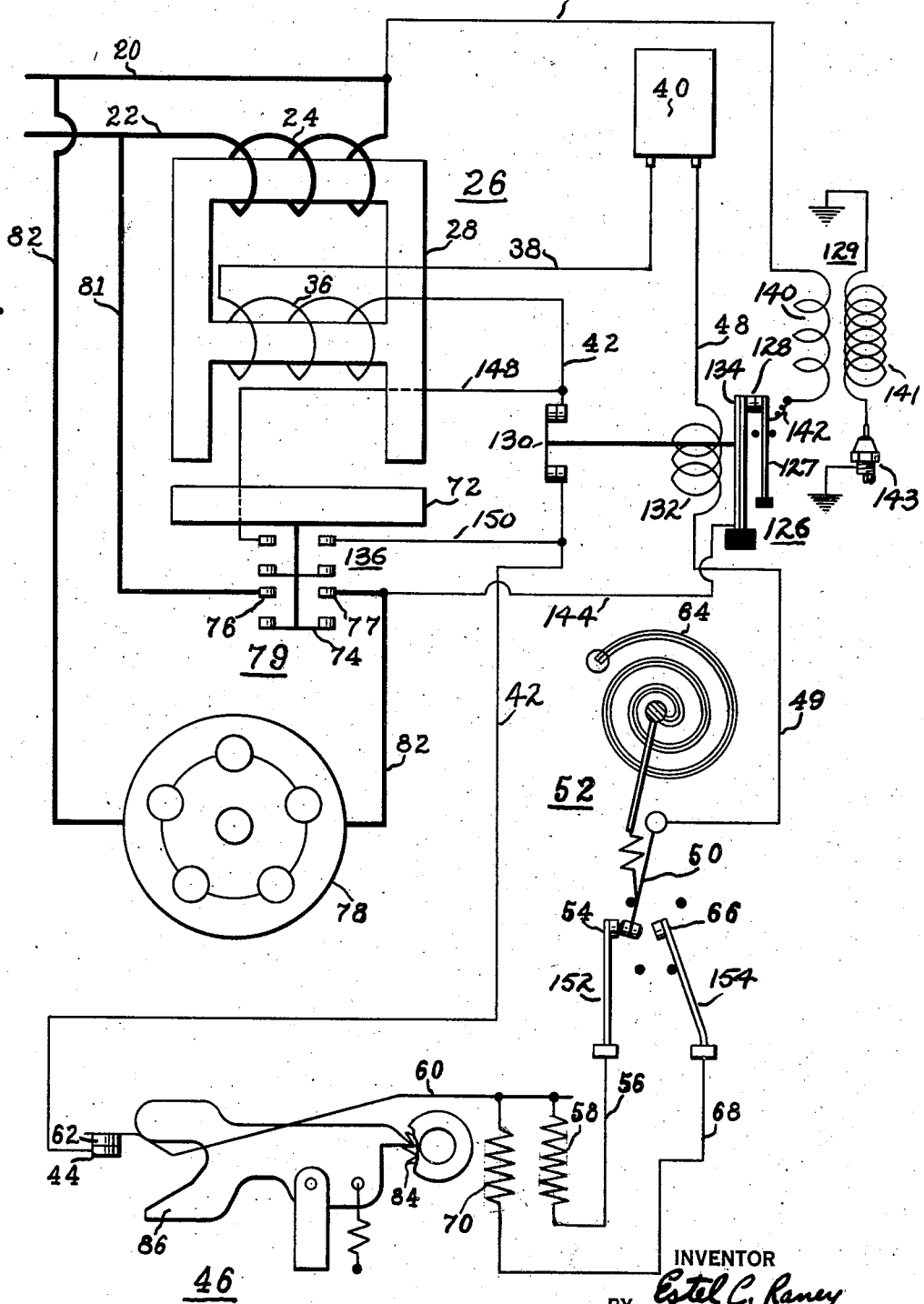

Either of the aforementioned circuits may be modified to include an intermittent ignition apparatus. Fig. 3 shows such a circuit, where the ignition apparatus is applied to the circuit generally described in Fig. 1.

This circuit utilizes a timing device in the form of a bimetallic control 126, which control includes a normally closed switch 128 in circuit with an ignition transformer 129, and a normally closed switch 130 disposed in the secondary circuit of the transformer relay 26. The timing device 126 is actuated by a bimetallic element 134, which element is heated by resistance heater 132.

It is desirable to provide a holding circuit to shunt out the switch 130 when the system is operating properly. This holding circuit is completed by the closure of a switch 136 which is actuated by the movable armature 72 of the transformer relay. Thus when the armature is actuated, the switch 136 closes simultaneously with the motor switch 79. In this manner the holding circuit is established upon energization of the motor.

The circuit including switch 136 may be traced as follows; transformer relay secondary 36, wire 38, room thermostat 40, wire 48, resistance heater 132, wire 49, combustion control switch 52, circuit breaker 46, wire 42, switch 130 to the secondary 36. A secondary holding circuit is also provided to shunt out the switch 130. This circuit includes wire 150, switch 136, and wire 148. Thus when switch 136 is closed, due to completion of the secondary control circuit, the switch 130 is shunted out of the line and its control is replaced by the parallelly connected switch 136.

The primary ignition circuit includes wire 138 which is connected to one side of the line 20, primary 140 of the ignition transformer 129, switch 128, bimetallic member 134, wire 144, switch 79, wire 81 to the other side of the line 22. Thus the initial energization of the ignition transformer is controlled by the motor switch 79. The operation of this switch is in turn dependent on the secondary control circuit of the transformer relay 26. The secondary 141 of the ignition transformer is grounded at one pole thereof and is also connected to one terminal of a spark plug or other type of igniting device 143. The plug is in turn grounded at its other terminal.

In operation, when the thermostat 40 closes, due to a demand for heat, the secondary control circuit is completed, which causes the armature 72 to close switches 79 and 136. This simultaneously initiates operation of the ignition transformer and the fuel feeding device. Within the secondary circuit, the current induced passes through the resistance heater 132. The heater affects the adjacent bimetallic member 134 and after a predetermined time interval the member 134 deflects sufficiently to successively open switches 130 and 128. It will be noted that the opening of switch 128 is delayed due to the following action of the contact mounted on the spring member 127. As soon as this member has followed the deflection of the bimetallic element 134 through its limited span of movement the contacts of switch 128 are opened to render the ignition device inoperative. Thus the ignition device is operative for a predetermined period only at the initiation of each operating cycle.

It will also be noted that although the switch 130 has been opened by the deflection of the bimetallic element 134, that the secondary circuit is maintained operative through the shunt holding circuit as completed through switch 136.

In order to maintain the system operative it is necessary to modify the combustion control 52, from the construction previously described, to provide a constantly energized secondary circuit. In other words when the movable contact 50 snaps from contact 54 to contact 66 there is a momentary interruption of the circuit when using the control as shown in Fig. 1. This momentary interruption of current would cause the armature 72 to drop and break the holding circuit, and since the switch 130 has been opened by the movement of the bimetal 134, the system would be rendered inoperative. In order to prevent the occurrence of this condition the contacts 54 and 66 are mounted on spring members 152 and 154 respectively which members allow either contact to follow the movable contact 50 to its dead center position where a circuit is made through the other contact. At this point the movable member snaps to the opposite position and breaks contact with its following contact. In other words the control 52 is so designed as to assure a circuit therethrough during its transition from one position to another. The specific structure disclosed need not be followed but any means of accomplishing a similar result may be used.

In case of current interruption due to power failure, the armature 72 drops down to break the motor and holding circuits, which circuits cannot be remade until the control 126 is again in the starting position. This assures ignition whenever the motor blower starts to operate.

From the foregoing it will be noted that I have provided a control system that is complete, both from an operation and a safety standpoint. The system includes a secondary, or low voltage control circuit that eliminates arcing at the switch contacts, and obviates the necessity of conduit wiring; it also includes a thermal responsive circuit breaker that is maintained heated and in constant position for operation when the fuel burner is inoperative and which circuit breaker is compensated against voltage or ambient temperature variations to operate substantially within a given time period at all times. It further includes an intermittent ignition device in connection with a holding circuit which assures ignition at the start of each motor energization and which device provides a timing period of ignition.

While the forms of embodiment of the present invention as herein disclosed constitute preferred forms, it is to be understood that other forms might be adapted, all coming within the scope of the claims which follow.

I claim:

1. A fuel burning system comprising in combination, a fuel feeding device, an electrically operated switch for controlling said device, control means adapted to operate at a predetermined temperature to deenergize said device, a plurality of electrically operated heating means thermally associated with the control means, each heating means adapted to be connected in series with said electrically operated switch, one of said heating means when operative adapted to heat the control means to a temperature less than said predetermined temperature, another of said heating means being adapted to heat the control means to said predetermined temperature, and means responsive to a condition of combustion for connecting one of said heating means in series with the electrically operated switch and disconnecting the other of said heating means and responsive to a change in said combustion condition for disconnecting the said one heating means and connecting the said other heating means in series with the electric operated switch.

2. In a control system for a fuel burner, an electrically operated switch for controlling operation of the fuel burner; a thermal responsive control device adapted to operate at a predetermined temperature to render the burner inoperative; a pair of electrically operated heating means each adapted to be connected in series circuit with said electrically operated switch and thermally associated with the said control device, one of said heating means, when energized, being operative to maintain said device at a temperature below the said predetermined temperature, and the other of the heating means when energized, being operative to heat the control device to the said predetermined temperature; and means responsive to combustion conditions for connecting one of said heating means in series circuit with said electrically operated switch and for disconnecting the other of the heating means.

3. A control system for combustion apparatus comprising; an electrically operated fuel feeding device; electrically operated means for controlling said device; a control circuit for the electrically operated means; a normally closed switch in the control circuit; an ignition device for igniting the fuel; a timing device adapted to successively open the said switch and then render the ignition means inoperative after a predetermined period of operation of the ignition means, said timing device being rendered operative substantially simultaneously with the energization of the fuel feeding device; a thermally responsive circuit breaker in the control circuit for opening the circuit when the circuit breaker is heated to a predetermined temperature; a pair of heating elements adapted to be connected in the control circuit and thermally associated with the circuit breaker, one of the said elements, when energized, maintaining the temperature of the circuit breaker at a temperature below the said predetermined temperature, the other of said elements, when energized, being adapted to heat the circuit breaker to the said predetermined temperature; means responsive to combustion condtions for connecting one of the elements in the control circuit and substantially immediately thereafter disconnecting the other of the said elements from the control circuit; and means operated by the electrically operated means for establishing a maintaining circuit around said normally closed switch prior to the opening of said normally closed switch by the timing device.

4. A control system for combustion apparatus comprising, an electrically operated fuel feeding device; electrically operated means adapted to control said device; a control circuit for the electrically operated means; an ignition means for igniting the fuel, said ignition means being rendered operative when the fuel feeding device is energized; a control device operable to break the control circuit; a thermal responsive circuit breaker; heating means for affecting operation of the circuit breaker; a pair of circuits for the heating means; switch means for connecting one of the said heating circuits and disconnecting the other of the said heating circuits in the control circuit in response to a condition of combustion, said switching means being adapted to maintain one of the heating means circuits connected in circuit until after the other of such circuits has been connected in the control circuit; and means operated by the electrically operated means for maintaining said control circuit after the control device has operated.

5. In a control system for combustion apparatus comprising, an electrically operated fuel feeding device; electrically operated means for controlling said device; a control circuit for energizing the electrically operated means; a switch for maintaining said control circuit energized, said switch being closed by the said electrically operated means; a thermal release switch adapted to control said control circuit, said thermal switch having a pair of heaters connected in the control circuit; means for connecting one of said heaters in the circuit and disconnecting the other heater in response to combustion; and means for maintaining said other heater in circuit until said one heater is connected in said circuit.

ESTEL C. RANEY.